United States Patent [19]

Jang

[11] Patent Number: 5,505,361
[45] Date of Patent: Apr. 9, 1996

[54] REVIEW POLE ARM CLAMP WITH STATIC ELECTRICITY DISCHARGE FOR STABILIZING A TAPE

[75] Inventor: Myoung-sub Jang, Suwon, Rep. of Korea

[73] Assignee: Samsung Electronics Co., Ltd., Kyungki-Do, Rep. of Korea

[21] Appl. No.: 278,222

[22] Filed: Jul. 21, 1994

[30] Foreign Application Priority Data

Aug. 16, 1993 [KR] Rep. of Korea .................. 93-15770

[51] Int. Cl.$^6$ .................................................. B65H 23/02
[52] U.S. Cl. .................................. 226/194; 242/358
[58] Field of Search .................................. 226/194, 190, 226/191, 181, 183; 242/346.1, 346.2, 354, 324, 358; 360/85

[56] References Cited

U.S. PATENT DOCUMENTS

| | | | |
|---|---|---|---|
| 3,561,660 | 2/1971 | Nicol et al. | 226/194 X |
| 3,799,422 | 3/1974 | Matsumoto | 226/196 |
| 3,843,035 | 10/1974 | Fitter et al. | 226/196 X |
| 4,326,660 | 4/1982 | Scianna, Sr. et al. | 242/358 X |
| 4,527,208 | 7/1985 | Okita et al. | 242/358 X |

FOREIGN PATENT DOCUMENTS 3-296951  12/1991  Japan ..................................... 242/354

Primary Examiner—John M. Jillions
Attorney, Agent, or Firm—Sughrue, Mion, Zinn, Macpeak & Seas

[57] ABSTRACT

A review pole support structure in a tape recorder minimizes the vibration of a review pole, which is used for guiding tape movement, and enables easy control of the perpendicularity and height of the review pole. The review pole support structure includes a review arm to which the review pole is perpendicularly and fixedly attached. The review arm is installed on the deck of the tape recorder so as to be rotatable between first and second locations, moving the review pole between first and second positions, respectively. In the second location, the review arm is pressed downward toward the deck by a resilient member to provide stability. Also, in the second position, a grounding member electrically contacts the review pole and the deck to remove static electricity from the review pole. Protrusions on the review arm are in contact with the deck.

6 Claims, 4 Drawing Sheets

REVIEW POLE ARM CLAMP WITH STATIC ELECTRICITY DISCHARGE FOR STABILIZING A TAPE

BACKGROUND OF THE INVENTION

The present invention relates to a support structure for a review pole in a tape recorder, the review pole guiding a tape moving on the deck of the tape recorder. More specifically, the present invention pertains to an improved review pole support structure for easily controlling the perpendicularity and minimizing the vibration of the review pole.

In general, a review pole provides tension to a tape that is transported in a reverse direction by a pinch roller and a capstan, thereby preventing the tape from becoming loose and winding around the pinch roller. FIGS. 1 and 2 show a prior art review pole support structure in a tape recorder mechanism. A sector gear 3, having a gear portion 3a, is mounted on a pin 5 in a manner to permit rotation of the gear 3 on the pin 5. The pin 5 is fixed on a deck 4. A review arm 1 is fixed at one end thereof to the sector gear 3; a review pole 2 is attached to the other end of the review arm 1. Gear portion 3a of sector gear 3 meshes with the gear teeth of a gear 6, which is driven by a motor 9 through a series of gears illustrated but not separately labelled in FIG. 1. Rotation of motor 9 causes rotation of gears 6 and 3 and review arm 1. The rotation of review arm 1 causes review pole 2 to place the tape (not shown) under tension as the tape is transported in the reverse direction between a capstan 7 and a pinch roller 8.

Since the review arm 1 is spaced above the deck 4, a certain structural instability exists. As a result the review arm may vibrate when an external shock is received or when the tape operates. If the review pole vibrates, the reproduced image will be unstable. In addition, instability of the review arm makes it difficult to control the perpendicularity and height of the review pole.

SUMMARY OF THE INVENTION

It is an object of the present invention to provide in a tape recorder, a review pole support structure, which minimizes the vibration of the review pole and easily controls the perpendicularity and height of the review pole. To accomplish the above object, there is provided a review pole support structure, comprising:

a review arm having a review pole fixed perpendicularly thereto, the arm being rotatable on the deck so that the review pole can be moved between a first position and a second position as the review arm rotates between a first location and a second location, respectively; and means for preventing the review pole from vibrating when located at the second position.

BRIEF DESCRIPTION OF THE DRAWINGS

The above object and other advantages of the present invention will become more apparent from the following description of a preferred embodiment thereof with reference to the attached drawings in which.

DETAILED DESCRIPTION OF A PREFERRED EMBODIMENT

Figure 1:
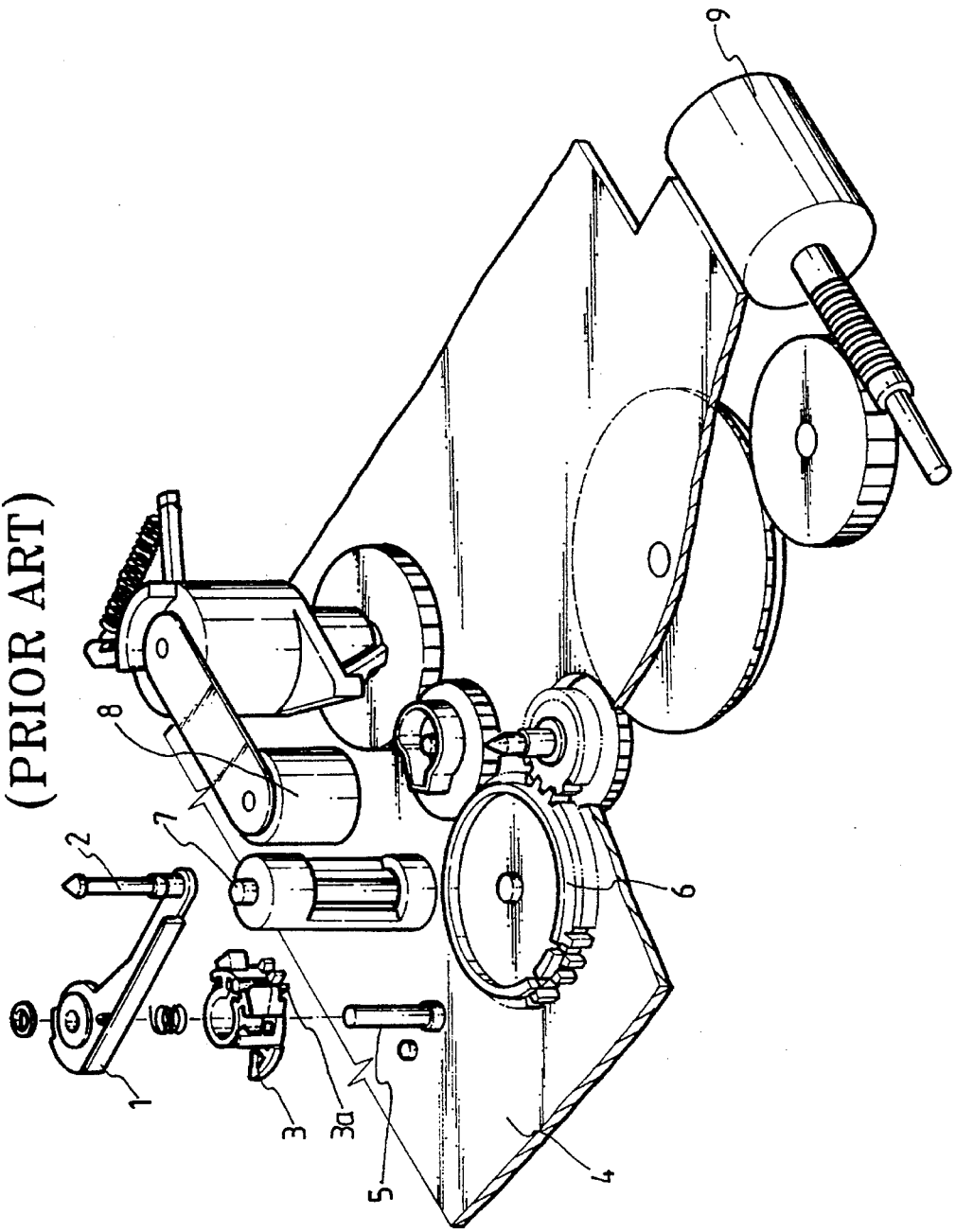
FIG. 1 is an exploded perspective view showing a conventional review pole support structure and review pole in a tape recorder.
Figure 2:
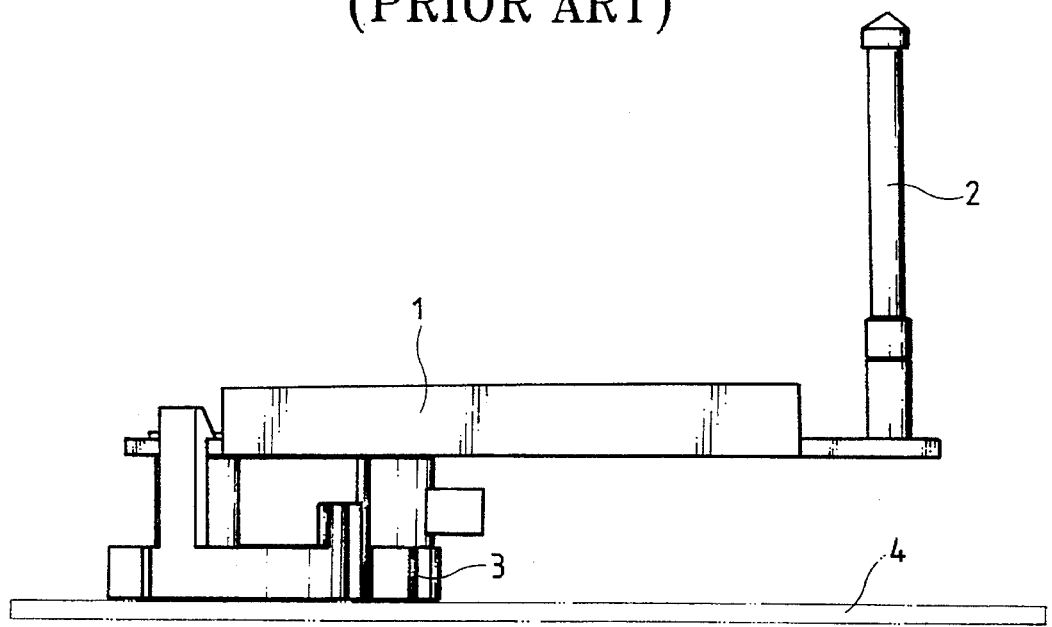
FIG. 2 is a side view of the device shown in FIG. 1.
Figure 3:
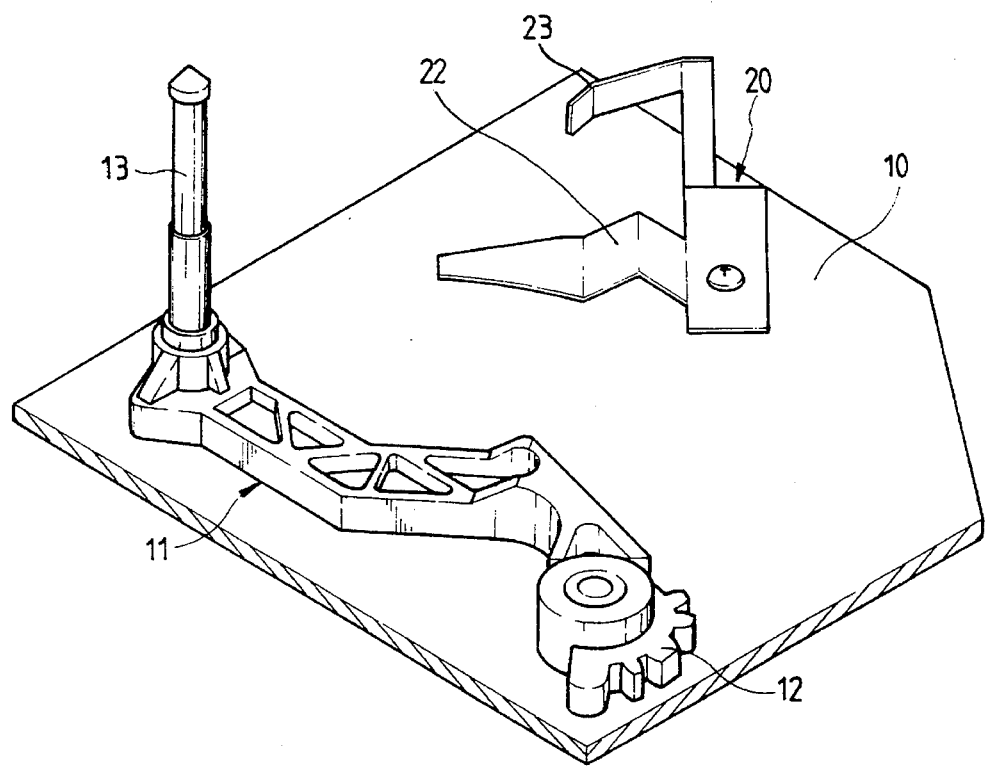
FIG. 3 is a perspective view of a review pole support structure and review pole in accordance with the present invention, wherein the review pole is located at a first position.
Figure 4:
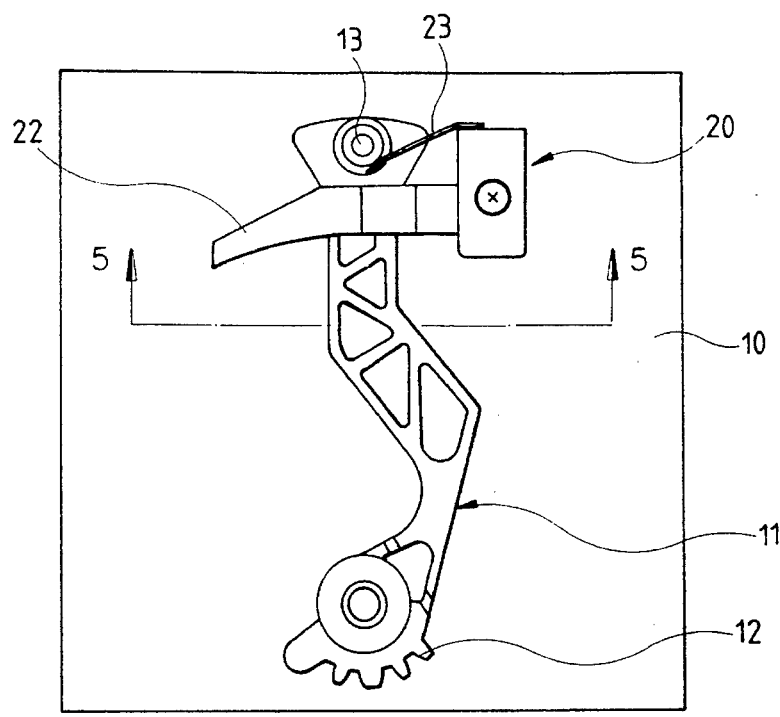
FIG. 4 is a plan view of the review pole support structure and review pole of the present invention, wherein the review pole is located at a second position and provides tension to a tape.
Figure 5:
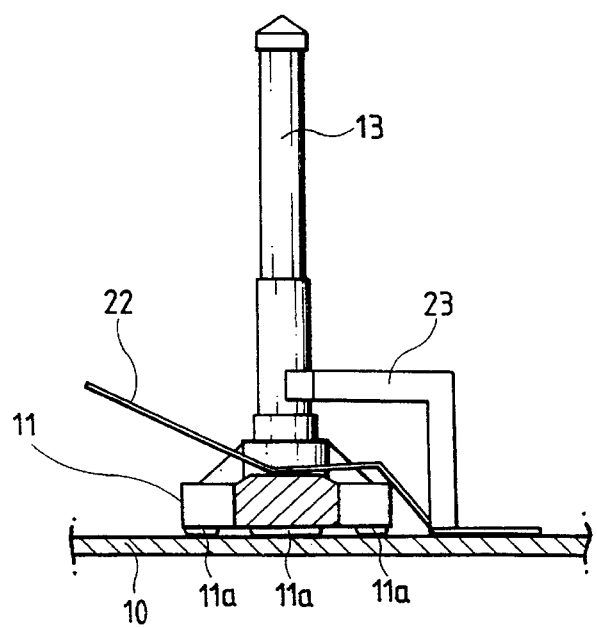
FIG. 5 is a cross-sectional view taken along line A—A of FIG.4.
Figure 6:
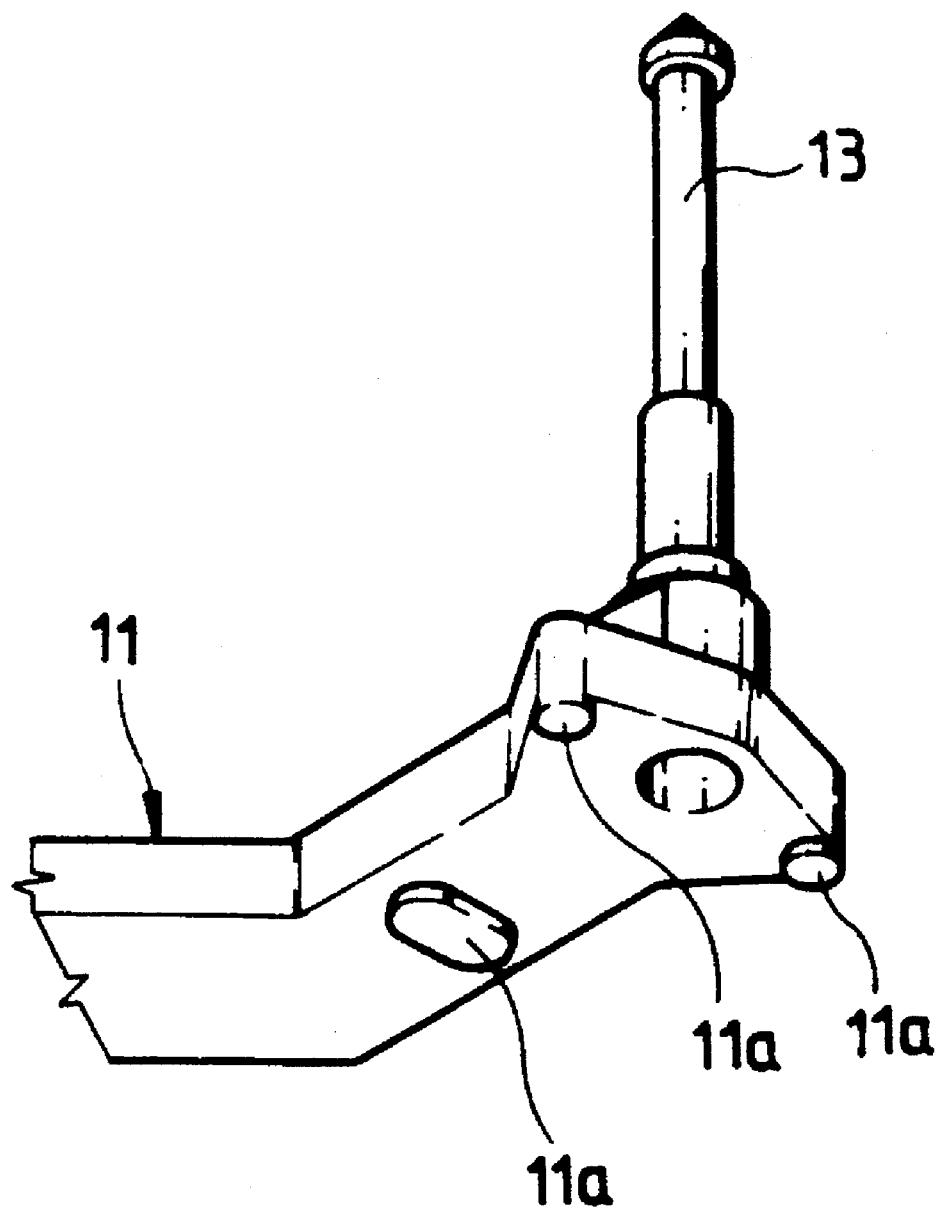
FIG. 6 is a perspective view showing the bottom surface of the review arm shown in FIG. 3.

As shown in FIGS. 3 to 5, a review pole support structure and review pole according to the present invention comprises a review arm 11 and a resilient plate member 20. A gear portion 12 for meshing with the teeth of a corresponding driving gear (not shown) is formed on one end of a review arm 11 to be rotatable on deck 10. The gear portion and review arm are preferably made of a resin. A review pole 13 is installed on the other end of review arm 11 in a manner to be perpendicular to the review arm. Due to the rotation of gear part 12 and attached review arm 11, the review pole 13 can be located selectively either at a first location (where the tape is not loaded on the review pole) shown in FIG. 3, or in a second location (where the tape is loaded on there view pole so as to guide the tape thereby) shown in FIG. 4. The review arm 11 remains in contact with the upper surface of the deck 10 while it is being rotated between the first and second locations through a plurality (for example, three) of support protrusions 11a on the underside thereof which contact the upper surface of deck 10, as shown in FIG. 6.

As shown in FIG. 4, the resilient plate member 20, comprising a pressure member 22 and a grounding member 23, is positioned at the second (loaded) location of the review arm. The pressure member is bent as shown and fixed at one end to the deck. When the review arm moves to the loaded location the pressure member 22 presses down on the review arm, thereby providing stability to the review arm and the review pole. Thus, review arm 11 and review pole 13 are prevented from shaking when there is an external impact.

The grounding member 23 is positioned to contact the review pole 13, when the review arm is at the second (loaded) location and to electrically ground the review pole 13 to deck 10, thereby static electricity from the review pole 13.

The review pole and support structure as described above is more stable than that in the conventional device, where the review arm is separated from the deck, because the review arm maintains contact with the deck while it is being rotated. Further, the perpendicularity and height of the review pole can be easily controlled.

In addition, the pressure member 22 of resilient plate member 20 urges review arm 11 down toward deck 10 when the review arm is at the second location, thereby minimizing the effect of external shocks, and in turn, minimizing the shaking of the screen image upon reverse reproduction of a video tape. Also, the grounding member 23 removes any static electricity remaining in review pole 13.

What is claimed is:

1. An apparatus for use in a tape recorder having a deck, comprising:

a review arm positioned on and rotationally attached to said deck to rotate about a rotational axis thereof between a first location and a second location while slidably contacting said deck;

a review pole attached to said review arm at a position removed from said rotational axis, whereby when said review arm rotates between said first and second locations, said review pole moves respectively between a first position, where said review pole does not provide tension to a tape of said tape recorder, and a second position, where said review pole does provide tension to a tape of said tape recorder; and a mechanical holder positioned to releasably hold said pole and review arm at said second position and second location, respectively, to reduce vibration of said review pole when said review pole is located at said second position.

2. The apparatus according to claim 1, wherein said mechanical holder comprises a resilient plate member fixed to said deck at one end thereof and free at another end thereof; said resilient plate shaped to permit said review arm to pass under said free end when moving toward said second location and to press down on said review arm when said review arm is at said second location.

3. The apparatus according to claim 2, further comprising a plurality of protrusions disposed on said review arm on the side of said review arm which faces said deck; said protrusions having a shape such that they are in physical, slidable contact with said deck.

4. The apparatus according to claim 1, further comprising an electrical grounding member; said grounding member being connected at one end thereof to said deck and being free at the other end thereof; said grounding member being positioned on said deck such that said free end comes into contact with said review pole when said review pole is at said second position, thereby removing static electricity from said review pole when said review pole is at said second location.

5. The apparatus according to claim 3, further comprising an electrical grounding member; said grounding member being connected at one end thereof to said deck and being free at the other end thereof; said grounding member being positioned on said deck such that said free end comes into contact with said review pole when said review pole is at said second position, thereby removing static electricity from said review pole when said review pole is at said second location.

6. The apparatus according to claim 2, wherein said resilient plate member comprises a bent plate member.

* * * * *